Figure 1:
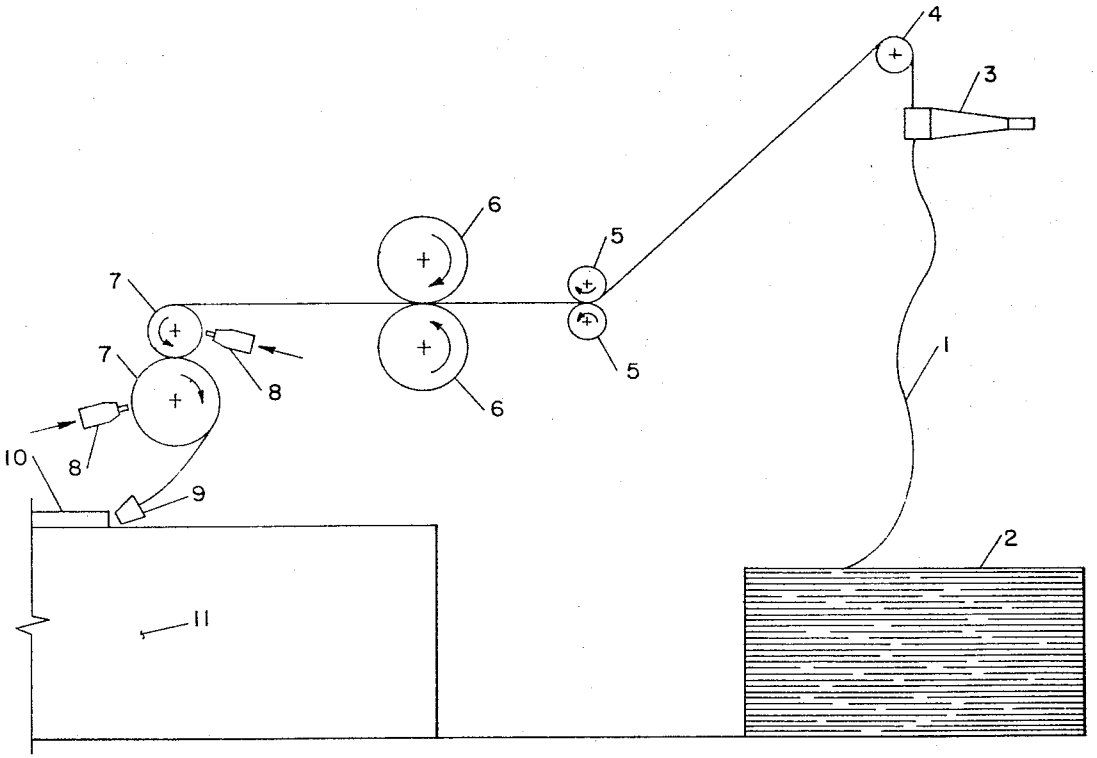
Figure 2:
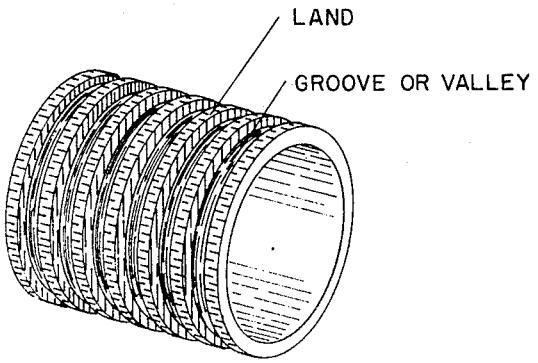
Figure 3:
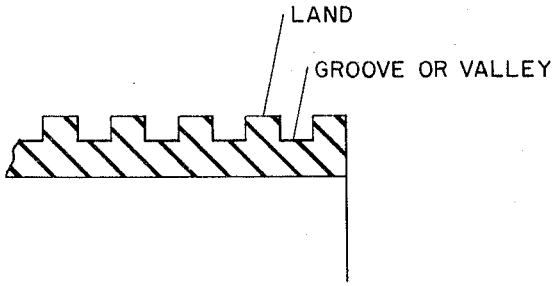
Figure 4:
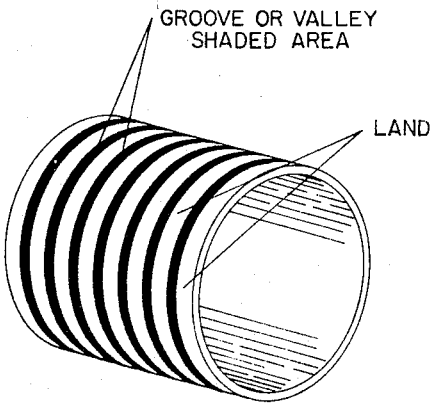
Figure 5:
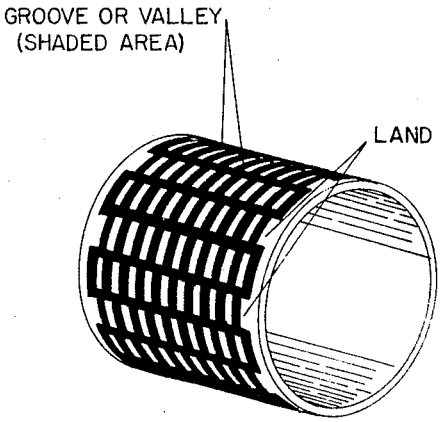
Figure 4A:
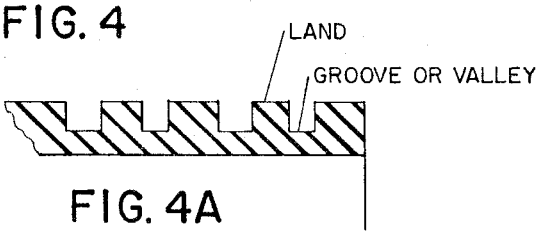
Figure 6:
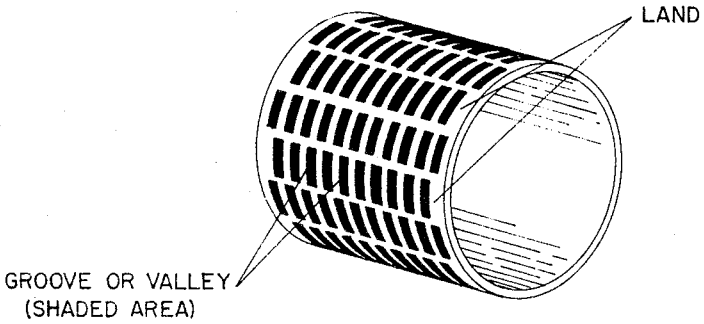
Figure 7:
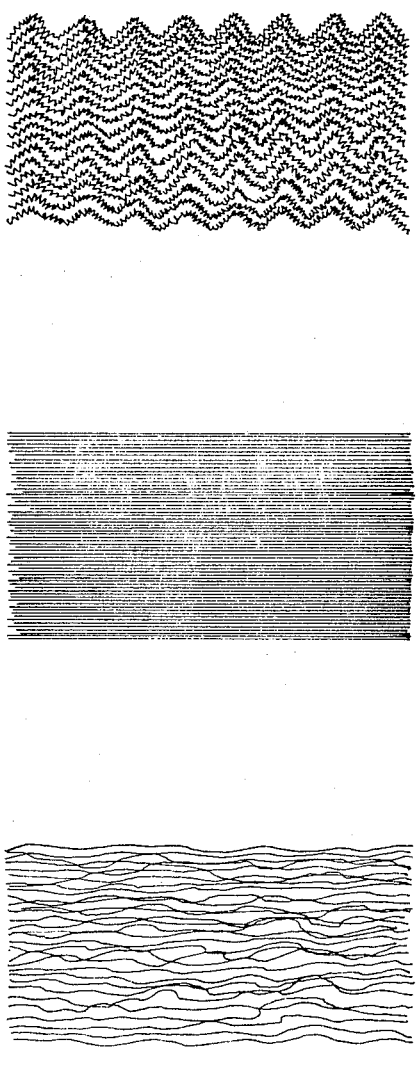
Figure 8:
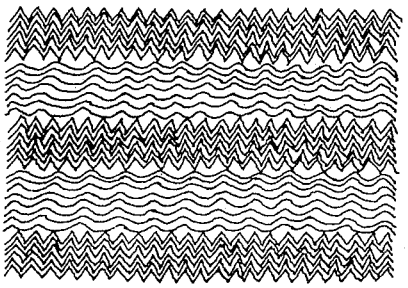
Figure 9:
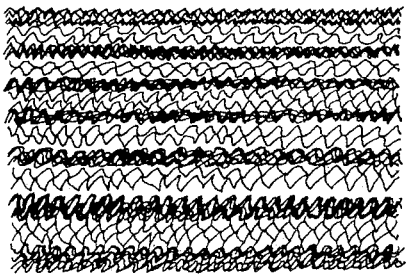
Figure 10:
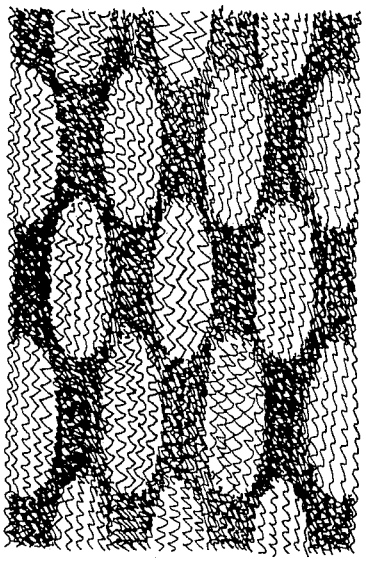
Figure 11:
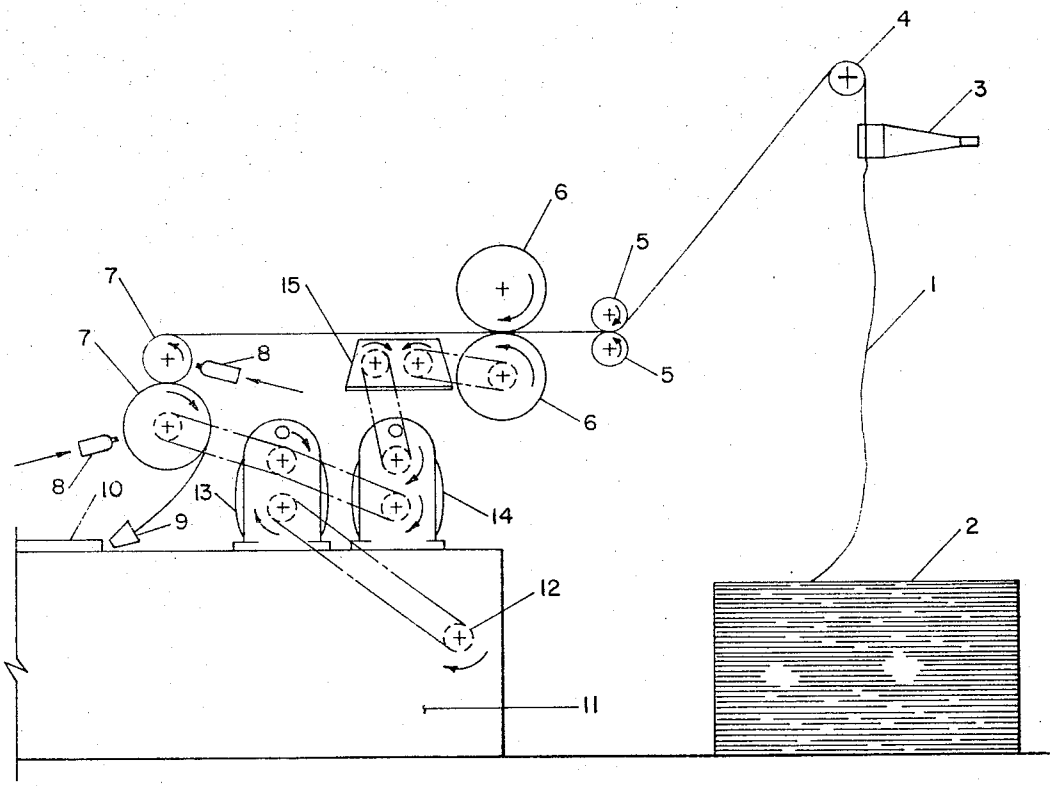

T861002

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 1, 1969

861 O.G. 17

785,020
TOW-TREATING PROCESS
Theodore C. Fritz, P.O. Box 511,
Kingsport, Tenn. 37662
Continuation of application Ser. No. 543,360, Apr. 18, 1966. This application Dec. 9, 1968. Published Apr. 1, 1969
Class 264—290
7 Sheets Drawing. 10 Pages Specification

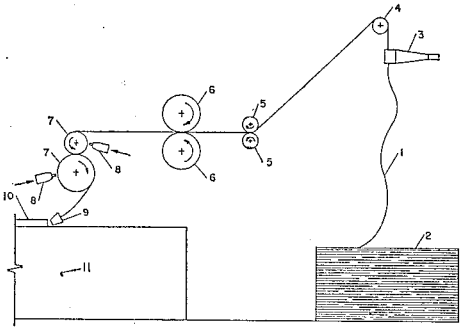

A method of opening and blooming continuous filament tow includes a tensioning step that causes a differential incremental longitudinal displacement between adjacent filaments without any substantial amount of lateral displacement.

T861002

April 1, 1969 | T. C. FRITZ | DEF. PUB.

TOW-TREATING PROCESS | SN - 785020

Original Filed April 18, 1966 | Sheet 1 of 7

THEODORE C. FRITZ
INVENTOR.

BY William J. French
Daniel B. Reece III
ATTORNEYS

T861002

THEODORE C. FRITZ
INVENTOR.
BY William T. French
Daniel B. Reece III
ATTORNEYS

T 861002

THEODORE C. FRITZ
INVENTOR
BY William T. French
Daniel D. Reggett III
ATTORNEYS

T861002

April 1, 1969 T. C. FRITZ DEF. PUB.

TOW-TREATING PROCESS SN - 785020

Original Filed April 18, 1966 Sheet 4 of 7

THEODORE C. FRITZ
INVENTOR.

BY William J. French
Daniel B. Reece III
ATTORNEYS

T861002

THEODORE C. FRITZ
INVENTOR.
BY William T. French
Daniel B. Reece III
ATTORNEYS

T861002

April 1, 1969 T. C. FRITZ DEF. PUB.

TOW-TREATING PROCESS SN - 785020

Original Filed April 18, 1966 Sheet 6 of 7

THEODORE C. FRITZ
INVENTOR.

BY William J. French
Daniel B. Reece III
ATTORNEYS

T861002

April 1, 1969 | T. C. FRITZ | DEF. PUB.

TOW-TREATING PROCESS | SN - 785020

Original Filed April 18, 1966 | Sheet 7 of 7

THEODORE C. FRITZ
INVENTOR.

BY William J. French
Daniel B. Reece III
ATTORNEYS